United States Patent Office 3,493,955
Patented Feb. 3, 1970

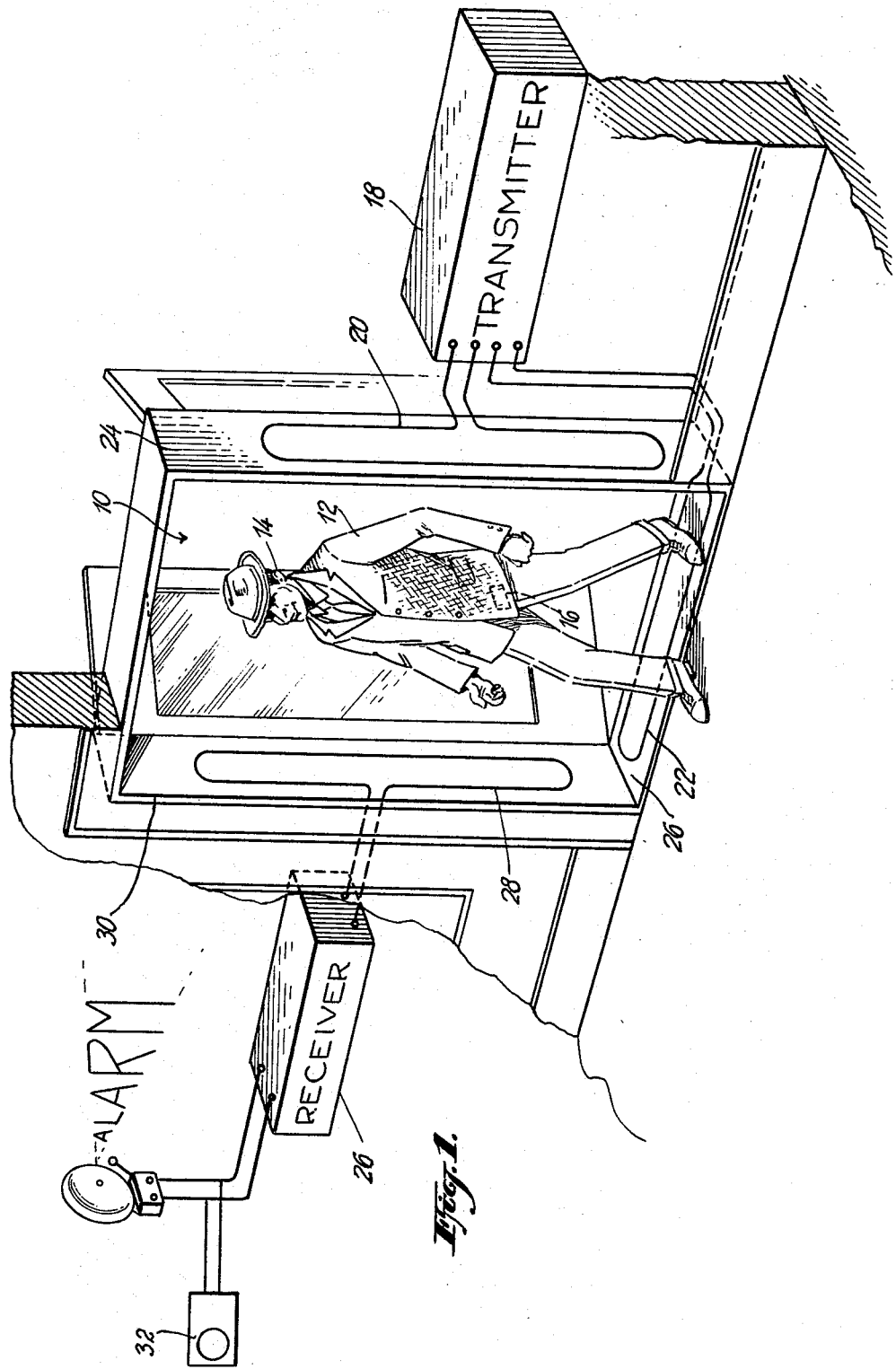

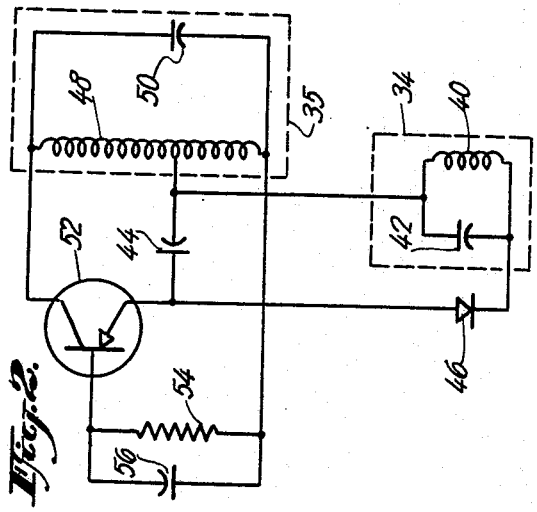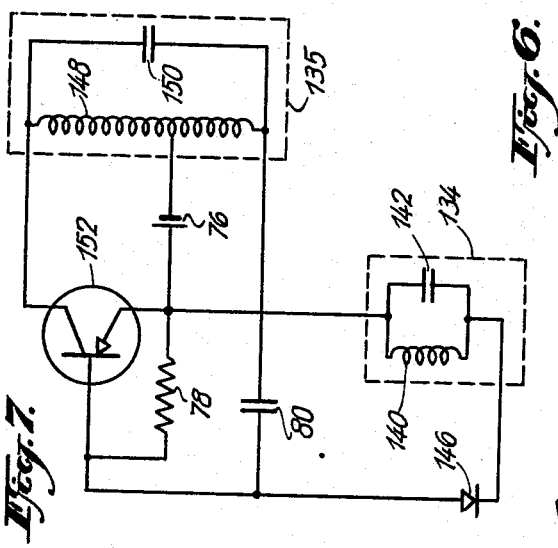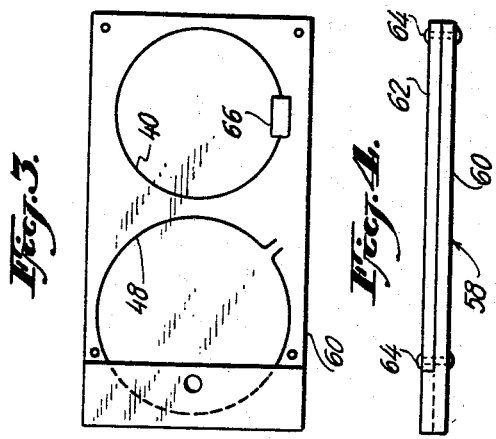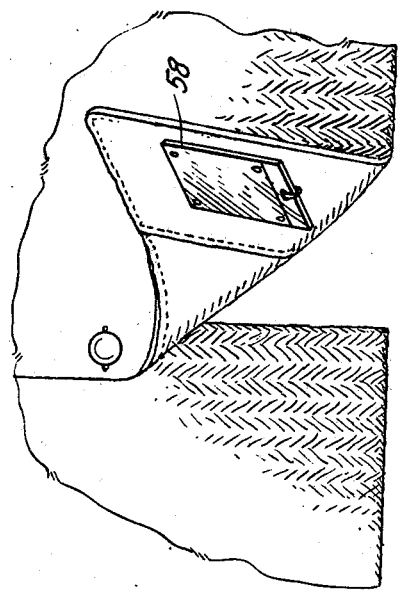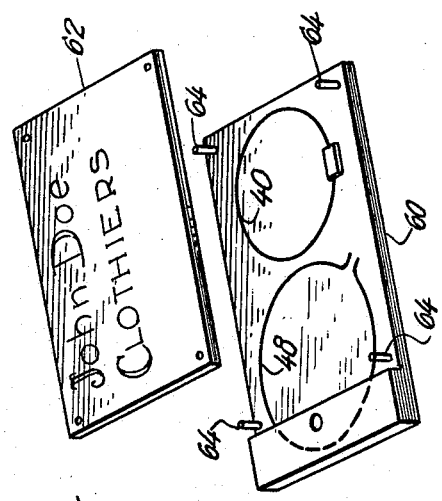

3,493,955
METHOD AND APPARATUS FOR DETECTING THE UNAUTHORIZED MOVEMENT OF ARTICLES
Arthur J. Minasy, Woodbury, N.Y., assignor to Monere Corp., Woodbury, N.Y., a corporation of New York
Continuation of application Ser. No. 437,383, Mar. 5, 1965. This application Apr. 17, 1968, Ser. No. 722,136
Int. Cl. G08b 13/00, 21/00
U.S. Cl. 340—258
10 Claims

ABSTRACT OF THE DISCLOSURE

Protection of goods through radio means, wherein the goods are provided with labels containing special electrical circuits which respond to signals of one frequency and rebroadcast signals of another frequency; wherein the circuits include loop antennae which function as regenerative tank circuits; wherein electromagnetic signals of one frequency are continuously transmitted in the vicinity of a checkpoint; and wherein receiver means are tuned to monitor the checkpoint for the occurrence of electromagnetic signals of the other frequency.

---

This is a continuation of Ser. No. 437,383, filed Mar. 5, 1965, and now abandoned.

This invention relates to the protection of merchandise and more particularly it concerns a novel method and apparatus for signalling the unauthorized passage of articles of merchandise past given checkpoints.

Shoplifting and other forms of pilfering account for considerable losses each year to a great many businesses. Unfortunately, the cost of floorwalkers, guards, checkers, etc., is generally so expensive that even where effective, these expedients tend to cost as much or more than the pilferage loss itself. Also, the presence of guards, etc., and the high chance of their mistakenly apprehending an innocent customer often results in considerable loss of a company's good will.

Various electrical and mechanical techniques have been proposed as possible solutions to this problem. However, these techniques are all either too costly, too dangerous, or too unreliable to be of practical utility. It has been proposed, for example, to provide a ratioactive material on the articles to be protected, and to provide a monitoring device, such as a geiger counter, at each exit location. However, many articles of merchandise are deleteriously affected by the presence of any radioactivity. Also, U.S. governmental regulations prohibit or severely restrict the use of radioactive materials in public surroundings.

It has also been proposed to transmit radio frequency energy at a given frequency in the vicinity of a checkpoint; and to provide on the articles being protected, frequency selective power absorption devices which cause a sudden absorption of power from the transmitter when they pass through the checkpoint. Meter means, such as a grid leak detector would then measure the transmitter response to such power absorption and thus indicate the passage through the checkpoint of any article of merchandise carrying such power absorption device.

The frequency selective power absorption technique, however, does not lend itself well to actual practice, for the amount of power absorption obtained in a device attached to an article being protected is an extremely small fraction of the total power output of the transmitter. Also, such devices have poor frequency selectivity and there are many articles of merchandise whose very structure may produce as much or more power absorption than the devices to be attached to them. Thus, where the alarm works at all, it is incapable, in many cases, of differentiating between protected and unprotected articles.

All of the above difficulties are overcome with the present invention. According to the present invention there is provided a safe and effective arrangement for monitoring the unauthorized passage of articles past a given checkpoint. Such monitoring is fully automatic and requires no personal exposure to hazardous radiation. Also, it eliminates the need for guards; and, in fact, it does not even require the presence of any readily visible apparatus. With the present invention, a high degree of sensitivity and signal selectivity is obtained so that innocent purchasers are in no danger of being misapprehended and yet virtually complete protection is afforded to the proprietor of the protected goods. Also, the operation of the invention is not affected by the presence of most other materials and structures so that virtually complete protection is obtained irrespective of the amount of concealment which may be employed by a person attempting to steal the protected goods.

According to the present invention, radio signals are transmitted continuously in the vicinity of a given checkpoint through which various articles of merchandise are expected to pass. These transmitted signals are coded or provided with a first distinctive signal characteristic. The region about the checkpoint is also continuously monitored for the occurrence of radio signals having a second distinctive signal characteristic; and arrangements are made to actuate an alarm whenever such signals occur. A rebroadcaster device is affixed to each article to be protected. This rebroadcaster device includes an electrical circuit arranged to broadcast or transmit radio signals having the second distinctive signal characteristic whenever radio signals having the first distinctive signal characteristic become incident upon it. Thus, although the first signals are transmitted continuously, they are incapable of actuating the alarm for they do not possess the required second distinctive signal characteristic. On the other hand, when an article bearing a rebroadcaster device is brought into the vicinity of the checkpoint, it responds to the transmitted signals and rebroadcasts further signals having the second distinctive signal characteristic; and thus in turn produces alarm actuation.

In the illustrative embodiments to be described more fully hereinafter, there is provided a radio transmitter which transmits a continuous signal at a first fixed frequency. There is also provided a receiver tuned sharply to respond only to a second frequency and arranged to actuate an alarm upon the occurrence of radio signals at the second frequency. The radio rebroadcaster device in each of the two illustrative embodiments comprises a first resonant circuit tuned to the first frequency, a second resonant circuit tuned to the second frequency and means interconnecting the two resonant circuits such that resonation of the one at its tuned frequency produces resonation of the second. Each resonant circuit includes a coil, which in the case of the first resonant circuit serves, as a receiving antenna; and in the case of the second resonant circuit, serves as a transmitting antenna. The interconnecting means includes a diode arranged to convert the energy present in the first resonant circuit to a bias voltage; and an amplifying device, such as a transistor, arranged to maintain oscillation of the second resonant circuit at its tuned frequency. In one embodiment the energy extracted from the first resonant circuit by the diode is supplied to the transistor and used by it to maintain oscillation of the second resonant circuit. In a second embodiment this energy is used to supply a bias voltage to the transistor to bring it up beyond its cutoff point. This, in turn, completes a circuit between a separate battery, the transistor, and the second resonant circuit; so that the battery may then supply energy via the transistor to maintain the second resonant circuit in oscillation.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification wherein:

FIG. 1 is a fragmentary perspective view of a doorway together with a schematic block diagram of the overall system of the present invention illustrating one application thereof;

FIG. 2 is an electrical circuit diagram of one form of a rebroadcast device used in the present invention;

FIG. 3 is a top plan view illustrating the structural arrangement of a rebroadcast device used in the present invention;

FIG. 4 is an edge view of the structure of Fig. 3;

FIG. 5 is an exploded perspective view of the structure of Fig. 3;

FIG. 6 is a fragmentary view illustrating one manner of mounting the rebroadcast device of FIG. 3; and FIG. 7 is an electrical circuit diagram of an alternate form of a rebroadcast device used in the present invention.

FIG. 1 illustrates a doorway, indicated generally at 10, outfitted to operate as a fixed checkpoint according to the present invention for monitoring the unauthorized passage therethrough of protected articles. In the case illustrated, one such protected article happens to be a jacket 12 worn by a man 14 walking through the doorway 10.

The jacket 12 is "protected" by means of a small card size rebroadcaster device 16, which is either sewn into or otherwise attached on the jacket 12. This rebroadcaster device, as will be described in greater detail hereinafter, has included therein or thereon, an electrical circuit capable of receiving radio signals of a first frequency, and then retransmitting them at a second frequency.

A radio transmitter 18 is provided near the doorway 10. This transmitter provides a continuous or non-modulated radio frequency output signal which in turn is radiated simultaneously from main and auxiliary transmitting antennas 20 and 22, respectively.

The transmitter 18 may be of very simple construction. It may, for example, merely comprise an oscillator circuit tuned by a crystal; and a frequency doubler and signal amplifier connected between the oscillator and the antennas 20 and 22. In the illustrative case, the transmitter output frequency is chosen to be 27.2 megacycles, while its output power is set at approximately 20 watts. This is within the Citizen Band limits and thus no license is required for its operation.

Each of the transmitter antennas 20 and 22 is formed of a one turn loop of oblong or elliptical shape. The antennas are oriented orthogonal to each other for reasons which will become more apparent hereinafter. As shown in the drawing, they are imbedded respectively in one doorpost 24 and a doorsill 26 of the doorway 10. In actual practice and in order better to fit within the confines of the doorway structure, the main antenna loop 20 may take the form of an ellipse approximately 2½ feet and 1½ feet along its major and minor axes respectively.

The two transmitter antennas 20 and 22 are placed orthogonal to each other and at displaced points about the checkpoint or doorway in order to present maximum radio energy to the rebroadcast device 16; so that no matter how the rebroadcast device is oriented as it goes through the doorway, it will always face a source of transmitted energy. Since the rebroadcast device itself retransmits substantially omnidirectionally, the single receiver antenna 28 is sufficient to receive signals from the rebroadcast device irrespective of how the rebroadcast device may be oriented.

A radio receiver 26 is also located in the vicinity of the doorway 10. This receiver is tuned to respond to receive radio signals having a frequency different than the output signal frequency of the transmitter 18. These signals are supplied to the receiver via a receiver antenna 28 imbedded in the opposite doorpost 30 of the doorway 10.

The receiver 26 may also be of very simple construction. In the illustrative embodiment, the receiver simply comprises a multiple stage amplifier arrangement with bandpass frequency filters intermediate each amplification stage. This arrangement makes the receiver responsive only to received signals within a certain prescribed frequency band. In the present case, this band is chosen to be between 5.1 and 5.9 megacycles, which is also within Citizen Band limits.

The receiver antenna 28 comprises a two turn loop and is arranged in a generally elliptical configuration, approximately 4 feet and 2 feet along its major and minor axes, respectively.

The output of the receiver 26 is connected to an alarm such as a bell 32, or a flasher light 33, which it causes to operate upon the reception of signals in the 5.1 to 5.9 megacycles frequency range.

The system operates in the following manner. During normal business hours, or at any time when it is desired to monitor the doorway 10 for unauthorized passage of "protected" articles, the transmitter 18 is maintained in continuous operation and the transmitter antennas 20 and 22 radiate radio signal energy at 27.2 megacycles in the region of the doorway. This energy, although incident upon the receiver antenna 28 and the receiver 26, is not effective to cause actuation of the alarm bell 32 or the flasher light 33, for the receiver is sharply tuned to respond only to signals between 5.1 and 5.9 megacycles. Now when a "protected article" such as the jacket 12 passes through the doorway 10, it carries with it the card-size rebroadcaster device 16. This rebroadcaster device, as mentioned above, is capable of receiving radio signals at one frequency and then retransmitting them at a new frequency. In the present case, the device 16 is tuned to receive signals at 27.2 megacycles and to retransmit signals at between 5.1 and 5.9 megacycles. Accordingly, when a "protected article" bearing such a rebroadcaster device passes through the doorway 10, it reacts to the signals of the transmitter 18, and retransmits signals at the frequency of the receiver 16, so that the receiver reacts to actuate the alarm bell 32 or flasher light 33.

The construction and wiring arrangement of a first form of the rebroadcaster device 16 is illustrated in FIGS. 2–5. Electrically, as shown in the schematic of FIG. 2, the device comprises a first resonant circuit 34 tuned to the first resonant frequency of 27.2 megacycles, a second resonant circuit 35 tuned to the resonant frequency of 5.5 megacycles, output means connected to the first resonant circuit, amplifier means connected between the output means and the second resonant circuit, and feedback means connected to feed back a portion of the signal in the second resonant circuit to be reamplified in the amplifier.

The first resonant circuit 34 is made up of a receiver coil 40 and a receiver capacitor 42 connected in parallel circuit arrangement. The receiver coil 40, which doubles as a receiving antenna, comprises one turn of wire formed in a loop approximately two and one-half inches in diameter.

The output means from the first resonant circuit 34 comprises an output capacitor 44 and a diode 46 connected in series with each other across the resonant circuit 34. When radio signals at the resonant frequency of the first resonant circuit (i.e., 27.2 megacycles) are incident upon it, the circuit will resonate in sympathy with these signals, taking energy from them. The output capacitor 44 and the diode 46 in turn act to restrict current flow out of the first resonant circuit to a single direction and to smooth variations in this output to establish, to a certain extent, a D-C voltage across the output capacitor 44.

The second resonant circuit 35 is made up of a transmitter coil 48 and a transmitter capacitor 50, also connected in parallel circuit relationship. The transmitter coil 48 which doubles as a transmitter antenna, is made up of four turns of wire formed in a loop approximately 2 inches in diameter.

The amplifier comprises a transistor 52 of the p-n-p variety. The collector and emitter of the transistor 52 are connected in series with the first three turns of the transmitter coil 48 across the output capacitor 44.

The feedback means comprises a resistor 54 connected between the base of the transistor 52 and a point between the last turn of the transmitter coil 48 and the transmitter capacitor 50. A base capacitor 56 is connected in parallel with and across the resistor 54 and cooperates with the resistor to maintain a D-C bias on the base of the transistor.

The rebroadcast device operates in the following manner. Incident radio signals at 27.2 megacycles cause the first resonant circuit 34 to resonate at that frequency, and thus to draw energy from these signals. This resonance, as described above, causes the output means to establish and to maintain a D-C voltage across the output capacitor 44. This voltage in turn is applied across the collector and emitter terminals of the transistor 52 via the upper three turns of the transmitter coil 48. At the same time a portion of this voltage is also applied via the lower turn of the transmitter coil 48 and the resistor 54 to the base of the transistor 52. These voltages bias the transistor above cutoff so that it begins to conduct. As the transistor begins to conduct, inherent non-linearities in the system cause a spectrum of frequencies to be generated. However, because of the parameters of the second resonant circuit 35, only that portion of this frequency spectrum which is in the vicinity of 5.5 megacycles will have any appreciable amplitude. This portion is fed back, via the resistor 44 to the base of the transistor where it is re-amplified. Thus, the transistor 52 in conjunction with the second resonant circuit operates as an oscillator which transmits at 5.5 megacycles.

It will be noted that the above described circuit is wholly passive, i.e., it operates solely on the energy of incident radio frequency signals and thus needs no batteries or other external power source. Also, the circuit may be fully encapsulated and should last indefinitely.

As shown in FIGS. 3–5, the circuit of the rebroadcast device 16 is encased within a plastic card-like structure 58 which may be used, for example, as a label for the articles being protected. Also, as illustrated in FIG. 6, the card-like structure 58 may readily be affixed inside the hem or lining of an article of clothing where a would-be thief would not be aware of its presence. The card-like structure 58 includes a base 60 and a cover 62, which may be held on the base either by an adhesive or by rivet elements 64. The receiver and transmitter coils 40 and 48, are laid out in side by side arrangement on the base member 60 while the various other circuit elements are distributed about these two coils and are connected to one another either by means of wires or printed circuits.

The overall unit may be made quite small, the only restrictions being that the receiver and transmitter coils, which double as antennas, be of sufficient size to permit a reasonable amount of energy to be received and transmitted. If desired, these antenna coils may be made separate from but attachable to the card-like structure 58 in their proper circuit location. This, of course, would have the effect of permitting a very great reduction in the size of the card-like structure 58, for it would then only need to house the relatively small remaining circuit elements i.e., resistors, capacitors, diode and transistor. The separate antenna coils could be loops of very thin wire affixed permanently into the articles of merchandise to which the rebroadcast device is attached.

For certain applications, such as where the protected articles are to be loaned but not sold, it may be desired to have the rebroadcast device permanently attached to the articles and yet be capable of being rendered inoperable during the time that an authorized borrower is in possession of the article. Such an arrangement is advantageous, for example, in the case of a lending library where the books may be protected by having rebroadcast devices permanently installed in their jackets or covers; and where the device may not readily be rendered inoperative except by means of a special machine controlled by the librarian when a prospective borrower has given satisfactory identification. This may be prvoided, according to the present invention by means of a small non-conductive but magnetizable element such as a ferrite 66 located on or very close to one of the two antenna coils in the rebroadcast device. Normally this ferrite is in its non-magnetic state and has no effect on the operation of the device. When, however, it is desired to render the device inoperable so that the protected article may pass through the checkpoint without triggering an alarm, the ferrite is brought to its magnetic state. This has the effect of interfering with the electromagnetic fields of radio waves in the vicinity of the antenna coils and so effectively prevents operation of the rebroadcast device. The ferrite 66 may be switched back and forth from its magnetic to its non-magnetic state for rendering the rebroadcast device inoperative and operative respectively by means of a large electromagnet controlled by the librarian or custodian. By placing the rebroadcast device with the ferrite 66 within the field of the electromagnet, the ferrite will be switched from one state to another.

An alternate form of the rebroadcast device 16 is illustrated schematically in FIG. 7. In this alternate arrangement there is again provided a first resonant circuit 134, made up of a receiver coil 140 and a receiver capacitor 142 and tuned to the first resonant frequency. There is also provided a second resonant circuit 135, made up of a transmitter coil 148 and a transmitter capacitor 150 together tuned to the second resonant frequency. In this particular arrangement the receiver coil 140 was chosen to have two turns while the transmitter coil 148 was chosen to have five turns. The resonant circuits are interconnected with a diode 146 and a transistor 152 in a manner to be described. A battery 76 is connected in series with the upper three and one half turns of the transmitter coil 148 between the collector and emitter of the transistor 152. A base bias resistor 78 is connected between the emitter and base of the transistor 152; and a feedback capacitor 80 is connected between the transistor base and a point between the last turn and half of the transmitter coil 148 and the transmitter capacitor 150. The first resonant circuit 134 is connected in series with the diode 146 between the transistor base and emitter terminals.

In this circuit arrangement, the emitter and base of the transistor 152 are normally at the same potential so that the transistor remains below cutoff or in a non-conducting condition. Because of this, the circuit which includes the battery 76, the upper three and one-half turns of the transmitter coil 148 and the emitter to collector path of the transistor 152 is effectively opened. Accordingly, no current flows in this circuit and the battery 76 is not drained when the unit is not operating. When, however, signals at the resonant frequency at the first resonant circuit 134 become incident upon the rebroadcast device, the first resonant circuit begins to oscillate in sympathy with these signals and to extract energy from them. This oscillation, in conjunction with the diode 146, causes a voltage drop across the base bias resistor 78 so as to establish a base to emitter bias. This brings the transistor 152 above cutoff so that it begins to experience emitter to collector conduction. This effectively closes the circuit including the transmitter coil 148 and the battery 76. As the transistor begins to conduct, inherent non-linearities in the system cause a spectrum of frequencies to be generated. Because, however, of the frequency selectivity of the second resonant circuit, only those frequencies in the vicinity of its resonant frequency will pass through to the feedback capacitor 80 for reamplification in the transistor 152. Thus, as long as a bias potential exists across the base bias resistor 78 to maintain the transistor 152 above cutoff, the transistor and second resonant circuit will remain in oscillation. When however, incident signals at the resonant frequency of the first resonant circuit fail, and the circuit no longer maintains an output voltage across the base bias resistor 78, the transistor 152 reverts to cutoff or a non-conducting condition and it no longer is able to maintain oscillation.

Because of the fact that most of the transmitted energy is supplied by the battery 76, it is not necessary in this alternate form of the rebroadcaster device to have receiver and antenna coils as large as in the previously described embodiment. It has been found, for example, that whereas coil diameters of approximately 2½ inches were required in the previously described embodiment, the coils in this alternate embodiment need be only ⅞ of an inch in diameter. Thus, although this second embodiment requires the addition of a battery, its overall size may be considerably reduced.

What is claimed as new and desired to be secured by Letters Patent is:

1. A radio rebroadcaster device capable of being concealed on articles of merchandise for protecting same from unauthorized removal by rebroadcasting radio signals at one frequency in response to the incidence thereon of radio signals of a different frequency, said rebroadcaster device comprising a first, essentially flat, expansive coil and a first capacitor connected to form a first resonant circuit which resonates at a first single frequency, said first coil being shaped and dimensioned to retrieve incident electromagnetic energy at said first frequency, a second, essentially flat, expansive multi-turn coil, and a second capacitor connected to said second coil to form a second resonant circuit which resonates at a second single frequency, said second coil being shaped and dimensioned to transmit electromagnetic energy when excited at said second frequency, a diode connected to said first resonant circuit to produce a unidirectional voltage in response to the resonation of said first resonant circuit at said first single frequency, an amplifying device having three electrodes, separate connecting means for connecting each electrode to a different point along said multi-turn coil, at least one of said connecting means including said diode in said first resonant circuit, said connecting means being arranged such that the energy retrieved by said first coil is supplied to said amplifying device and the amplified outputs from said amplifying device are applied to said second resonant circuit to produce resonant oscillations therein at said second frequency and wherein said second resonant circuit serves simultaneously as an antenna to transmit electromagnetic energy at said second frequency, and as a tank circuit to feed back control signals to said amplifying device at proper phase and amplitude to maintain self-oscillation at said second resonant frequency, and a card-like member mounting said circuit with said coils lying in side-by-side arrangement and the remaining elements distributed about said coils.

2. A radio rebroadcaster device as in claim 1 wherein said amplifying device comprises a transistor and wherein another of said connecting means includes a battery arranged to supply power to said transistor and wherein said one connecting means is arranged to maintain said transistor below its cutoff condition in the absence of said unidirectional voltage.

3. A radio rebroadcaster device as in claim 1 wherein one of said coils is provided with a non-conductive magnetizable element, which, when magnetized, prevents resonant oscillation of its associated resonant circuit.

4. A method of preventing the unauthorized taking of articles of merchandise from an enclosure having at least one limited egress facility and at least one article authorizing station therein, said method including the steps of attaching to individual ones of said articles, a radio rebroadcaster device capable of transmitting unmodulated radio waves solely in a second predetermined frequency range in response to the reception of radio waves in a first predetermined frequency range, thereafter, at said authorizing station, effectively relieving selected articles of an operable radio rebroadcaster device, confining the exit of all articles leaving said enclosure to a path through said limited egress facility, continuously transmitting unmodulated radio waves solely in said first predetermined frequency range at said egress facility, continuously monitoring a region including said egress facility for the emission from said rebroadcaster devices of unmodulated radio waves in said second predetermined frequency range and sounding an alarm in response to such waves, thereby indicating the unauthorized taking of articles from said enclosure.

5. A method as in claim 4 including the step of authorizing the taking of certain articles by deactivating their respective broadcast devices.

6. A system for detecting the unauthorized removal of articles from an enclosure, said enclosure having a passageway leading therefrom through which said articles may be removed, said system comprising a receiving antenna and a transmitting antenna mounted in unbalanced relation at said passageway, said transmitting antenna being mounted to direct radio frequency waves into said passageway and said receiving antenna being mounted to receive radio waves generated in said passageway, a transmitter of unmodulated radio frequency signals in a first predetermined frequency range connected to said transmitting antenna, a receiver tuned to receive signals in a second predetermined frequency range different from said first predetermined frequency range and connected to said receiving antenna, alarm means, said receiver including means responsive to the receipt of waves having said second predetermined frequency connected to said alarm means for actuating said alarm means when said last-mentioned waves are received, and individual radio signal rebroadcaster devices which are small relative to said articles and which are adapted to be carried inconspicuously thereon, each of said rebroadcaster devices consisting of a receiver of unmodulated waves in said first predetermined frequency range, a transmitter for producing unmodulated radio waves solely in said second predetermined frequency and means interconnecting said last-mentioned receiver and transmitter and responsive to receipt of said waves in said first predetermined frequency range to actuate said last-mentioned transmitter when said last-mentioned waves are received.

7. A system as in claim 6 wherein said transmitting and receiving antennas are mounted in spaced relation across from each other in said passageway whereby said rebroadcaster devices pass between said antennas.

8. A system as in claim 6 wherein said radio rebroadcast device includes transmitting and receiving antenna means.

9. A system as in claim 8 wherein said rebroadcasting device including said antenna means is encapsulated in a flat card-like element.

10. A system as in claim 8 wherein said radio transmitter includes at least two antennas oriented at right angles to each other at said check point.

References Cited

UNITED STATES PATENTS 1,853,021  4/1932  Alexanderson _____ 325—180 X
2,853,557  9/1958  Lehman et al. _____ 179—82
3,078,348  2/1963  McIntosh _____ 179—82

JOHN W. CALDWELL, Primary Examiner

D. L. TRAFTON, Assistant Examiner

U.S. Cl. X.R.

340—280

PO-1050
(5/69)

UNITED STATES PATENT OFFICE
CERTIFICATE OF CORRECTION

Patent No. 3,493,955        Dated February 3, 1970

Inventor(s) Arthur J. Minasy

It is certified that error appears in the above-identified patent and that said Letters Patent are hereby corrected as shown below:

Column 2, line 43, the word "thus" should be --this--;
Column 6, line 29, the word "prvoided" should be --provided--;
           line 60, the word "witha" should be --with a--;

Column 9, line 12, insert the following citation of references:

| | | | |
|---|---|---|---|
| 2,480,265 | 8/1949 | Rubenstein--------------331,181 | UX |
| 2,774,060 | 12/1956 | Thompson---------------340-280 | UX |
| 2,813,242 | 11/57 | Crump------------------331-185 | UX |
| 2,851,592 | 9/1958 | Webster, Jr.-----------331,185 | X |

Column 10, after line 1, insert the following citation of references:

| | | | |
|---|---|---|---|
| 2,943,189 | 6/1960 | Crump------------------331-185 | UX |
| 3,036,295 | 5/1962 | Kleist-----------------340-258 | | after line 3, insert the following citation of references:

| | | | |
|---|---|---|---|
| 3,088,106 | 4/1963 | Kingsford-Smith--------343-6.8 | |
| 3,253,588 | 5/1966 | Vuilleumier, et al-----325-185 | X |

FOREIGN PATENTS

| | | |
|---|---|---|
| 763,681 | 5/1934 | France (Picard)--------340-258 |

SIGNED AND
SEALED
SEP 15 1970

(SEAL)
Attest:

Edward M. Fletcher, Jr.
Attesting Officer

WILLIAM E. SCHUYLER, JR.
Commissioner of Patents